United States Patent Office 2,960,413
Patented Nov. 15, 1960

2,960,413

CARBON PELLETS FOR NEWS INK MANUFACTURE

Andries Voet, Borger, Tex., assignor to J. M. Huber Company, Locust, N.J., a corporation of New Jersey No Drawing. Filed Aug. 22, 1957, Ser. No. 679,749

8 Claims. (Cl. 106—307)

This invention relates to a process of preparing carbon black and, more specifically, to a process of preparing carbon black in the form of pellets which are readily dispersed in ink vehicles to produce news ink.

Carbon black, as conventionally produced from thermal decomposition of hydrocarbons has an apparent density of only about three pounds per cubic foot. This fluffy material is readily dispersed in fluid vehicles for printing inks. However, the points of manufacture of carbon black are usually far removed geographically from the points of its manufacture into printing ink. Accordingly, transportation of the carbon black to be used for the manufacture of the ink forms an important part of the cost of the ink. This fluffy form of carbon black suffers, as compared with the pellet form of carbon black, the economic disadvantage of a higher freight rate than pellets. Further still, this fluffy carbon black gives rise to a dust problem in handling. These problems are even more severe in alkaline blacks such as furnace blacks than in the acidic reacting channel blacks.

While the problem of dustiness in handling such fluffy carbon black is largely met, but only partially alleviated, by packing such black in bags carrying about twelve pounds each, the use of bags does not alleviate the limited amount of such fluffy carbon that can be transported in any one freight car. Further still, bagging of such fluffy material gives rise to the problem of "clingage," to the walls of the bags.

While various methods, such as pelletizing, have been proposed for increasing the apparent density of the fluffy carbon black, these methods have been relatively unsuccessful for alkaline blacks such as furnace blacks since these methods change the characteristics of the densified material with the result that it does not subsequently disperse in vehicles for news ink to form printing ink of desirable characteristics. This field of utility for alkaline carbon blacks such as furnace carbon black has accordingly been limited.

It is therefore an object of this invention to prepare pellets of carbon black having alkaline reaction, such as furnace black, which readily disperse in a news ink vehicle, and to form an ink therefrom.

It is a further object of my invention to provide a process for preparing pellets of carbon black of alkaline reaction which readily disperse in a news ink vehicle to form an ink.

It is a further object of this invention to provide a substantially dust-free pellet form of alkaline carbon black that is sufficiently strong to be efficiently and conveniently handled and transported and a process for its manufacture.

It is a further object of this invention to provide a substantially dust-free pellet form of alkaline carbon black that readily disperses in a news ink vehicle and that is sufficiently strong to be efficiently and conveniently handled and transported and a process for its manufacture.

It is a further object to form a composition of matter comprising, in pellet form, carbon black treated with an agent which, incorporated in said pellet, serves to disperse the carbon black particles in news ink vehicles, and a process for producing such composition of matter.

Other objects are to provide new processes and new compositions of matter and to advance the art. Still other objects and advantages of the invention will be apparent from the following specification in which the preferred embodiments are described.

These objects are accomplished according to my invention by thoroughly mixing a fluffy carbon black which has an alkaline reaction when dispersed in water, with a small amount of a material having the property of rendering smooth-flowing a buttery dispersion of that carbon in mineral oil, and thereafter pelletizing this mixture to a bulk or apparent density of about 18 pounds per cubic foot. The pellets so produced are strong and yet are readily dispersed in ink oil to form a commercially acceptable ink.

A preferred embodiment of my invention comprises a first step of admixing with 85–97 parts by weight of a mass of fluffy carbon black having an alkaline pH with 3 to 10 parts by weight of a liquid dispersing agent which has the capacity to render free-flowing a buttery mixture of twelve to fifteen parts by weight of that carbon black and 85 to 88 parts by weight of a mineral oil. This step of admixture is performed so as to provide a homogeneous distribution of the dispersing agent. The said dispersing agent preferably is in fluid form or admixed with a liquid diluent to bring it to fluid form, and distributed as a rapidly moving fine stream or as a spray while the carbon is being agitated. The dispersing agents preferred are petroleum derivatives such as gilsonite, manjak, and residues from propane dewaxing of asphalt base residues.

This first step is preferably followed by a second step of treating the mixture resulting from the first step, to produce a more uniform mixture. One manner of completing the distribution of the treating agent is to pass the mixture through a screen mill.

This second step is followed by a third step of pelletizing the product of the second step in conventional pelletizing equipment to an apparent density of about 14 to 20 pounds per cubic foot. The pellets thus produced are easily dispersed into a conventional news ink vehicle to form a smooth liquid suspension directly usable as an ink. This suspension may be passed through a conventional roll mill or colloid mill to more rapidly convert the suspension into a well-ground commercially acceptable printing ink.

In connection with the above-mentioned dispersing behavior of the pellets produced according to my invention, it is to be noted that it has heretofore been necessary to treat pelletized carbon blacks, including those obtained from channel blacks, in ball mills in order to provide commercially acceptable dispersions in conventional ink vehicles from pellets sufficiently strong to withstand loading and shipment in freight cars. Further, conventional pelletized channel and furnace blacks are not efficiently dispersed in such vehicles by a conventional three-roller mill because such pellets form a leathery coating which strongly adheres to the feed roll and requires so many passes for its removal therefrom that their dispersion by such treatment is not commercially feasible. Further still, while heretofore available pellets of furnace and carbon black could not be satisfactorily dispersed in the colloid mill to form news inks, the pellets produced according to my invention are dispersible merely by mixing at an elevated temperature or by such mixing followed by the use of the colloid mill.

In order to more clearly illustrate my invention, and the advantageous results to be obtained thereby, the following examples are given:

Example 1

A sample of fluffy channel carbon having an apparent density of 4 lbs. per cubic foot, and having a pH in water slurry of 4.6 was divided into two portions. One of these portions was heated to 800° C. and cooled in a slow current of combustion gas which protected it from oxygen. The resulting carbon had a pH in water slurry of 8.2.

Each of the two portions of carbon were then placed in separate pin mixers, heated to about 100° C. and, while being slowly agitated, were sprayed with 8 percent of the weight of the carbon of a heated known dispersing agent for that carbon in a news ink vehicle. The treating agent used was a tar-like residue obtained by the propane dewaxing of an asphalt base petroleum. This product had the property of changing a soft buttery dispersion of 14 parts of carbon in 86 parts of ink oil into a free-flowing viscous liquid when three parts thereof were stirred into the dispersed carbon. After mixing in the pin mixer both samples were passed through a high speed screen mill to complete the distribution of the treating agent.

Both the low and the high pH carbons were then placed in separate rotating drums and tumbled until formed into small pellets having a bulk density of approximately 18 pounds per cubic foot.

Each carbon was then used to prepare an ink of the following composition

| | Pounds |
|---|---|
| Medium viscosity ink oil | 84 |
| "Coblax" | 2 |
| Carbon pellets | 14 |

"Coblax" is a dark tar which is extracted during the refining of petroleum and acts as a dispersing agent for carbon black in mineral oil.

Each sample of ink was placed in a vessel, heated to 80° C., and mechanically stirred for four hours. At the end of this time the ink prepared with the high pH carbon was an acceptable ink while the ink containing the low pH carbon had much visible undispersed material. Each ink was then passed through a colloid mill and the residue held on a 325 mesh screen was determined. The ink from the low pH carbon had a screen residue of 3.1%, and was not usable. The ink from the high pH carbon had a 325 mesh screen residue of only 0.003% and was an entirely satisfactory ink.

Example 2

A sample of fluffy oil furnace black of an apparent density of 4 pounds per cubic foot and having a pH of 9.1 was treated at 100° C., in a pin mixer with 10 percent of its weight of a 50% solution of gilsonite in mineral oil diluent. The agitation in the pin mixer was continued for an hour at about 100° C. in order to complete the dispersion of the treating agent. The carbon was then tumbled to produce pellets weighing about 19.3 pounds per cubic foot. Fourteen pounds of these pellets and two pounds of gilsonite were added to 84 pounds of ink oil having a viscosity of 2 poises at 25° C. The mixture was heated at 70° C. in an agitated container for three hours, and was then given one pass through a three roller mill. The resulting ink had a residue on a 325 mesh screen of only 0.007%. The same carbon black without the above treatment with the mineral oil solution of gilsonite was pelletized to an apparent density of 19.5 pounds per cubic foot. Fourteen pounds of these pellets and two pounds of gilsonite were added to 84 pounds of the same ink oil used above and having a viscosity of 2 poises at 25° C. The mixture was heated in an agitated container for three hours and was then given one pass through a three-roller mill. This mixture formed a substantial leathery coating of carbon on the three roller mill and would not process into an ink under normal milling conditions.

Example 3

A sample of fluffy carbon produced in a furnace from natural gas was made into a paste with white mineral oil to contain 14 percent by weight of carbon. The resulting soft buttery mass at room temperature was thoroughly mixed with 4 percent of a 70% solution of Trinidad asphalt in xylene. The paste became a viscous liquid which at room temperature would flow from a spatula in a long string.

Another sample of the same carbon was thoroughly mixed in a mixer with eight percent of its weight of the above asphalt solution and was then passed through a screen mill. The treated carbon was made into pellets of 20 pounds' bulk density.

At the same time another portion of the same untreated carbon was made into pellets of approximately the same density. Each of the thus made carbon pellets was made into a batch containing 14 pounds of pellets, 2 pounds of a tar resulting from the propane dewaxing of an asphalt base petroleum residue, and 84 pounds of light weight mineral oil. Each batch was separately stirred at 80° C. for three hours and was then separately passed through a colloid mill. The batch containing treated carbon processed rapidly to produce an ink having a residue on a 325 mesh screen of only 0.002 percent. The batch containing the untreated carbon processed much more slowly and the resulting ink had visible undispersed particles when spread in a very thin film on paper and its residue on a 325 mesh screen was 3.16%.

Example 4

Five and one-half pounds of oil furnace black used to produce pellets known as "Aromex" HAF and produced by the process of United States Patent 2,625,466 and having an apparent density of three pounds per cubic foot, an approximate average particle diameter of 28 millimicrons, a surface area of approximately 80 square meters per gram and a pH of about 9.3 and which provides a light straw benzene extract color, are heated to about 325° F. in a conventional pin mixer of about three cubic feet capacity and wherein the beater runs at about 50 r.p.m.

A composition consisting essentially of 0.30 pound of a petroleum base ink oil having a viscosity at 100° F. of about 754 S.U., and 0.30 pound of gilsonite is made by dissolving the gilsonite in the oil diluent at 380° F. This composition is brought to a temperature at which it is still a freely flowing liquid, i.e. about 325° F. and then added in the form of a finely divided spray to that black while that black is being agitated as above described during a period of about five minutes whereby there is achieved a homogeneous distribution of the gilsonite containing composition throughout the mass of black.

The agitated carbon black to which the above-described gilsonite containing dispersing agent has been added, is then passed through a conventional screen mill (such as a Mikro-Pulverizer, No. 2 size), having 0.013 inch wide screen openings, to complete the process of homogenization. This treatment produces a carbon black having an apparent density of about two to three pounds per cubic foot.

The material which has passed through the screen mill is then pelletized to an apparent density of seventeen to eighteen pounds per cubic foot by being subjected to rolling action in conventional pelleting equipment—as a 48 inch diameter drum of 8 inch width rotating at 20 r.p.m. with a sufficient bed depth, as three to four inches, to provide for cascading and vigorous rolling in the upper layers of the bed.

The resultant pellets, for the major part, range between 10 and 20 mesh, and are substantially dust-free and free from any exhibition of "clingage" to the walls of paper bags or similar containers.

These pellets are also readily dispersed in a hydrocarbon news ink vehicle of about 750 S.U. at 100° F. by only mildly agitating about 16 parts by weight of the pellets with about 83 parts by weight of the vehicle, which vehicle contains about 1% by weight of gilsonite. This agitation of pellets and vehicle forms a smooth suspension. This suspension is then finished, as by passing through a three-inch Eppenbach laboratory colloid mill operating at 8,000 r.p.m. with a spacing of 0.024 inch. The ink thus produced is free-flowing, free of unground particles, i.e. with less than 0.002% by weight residue on a 325 mesh screen, and exhibits characteristics of length, tack, and viscosity that are entirely satisfactory for commercial purposes as a news ink and as good as those provided in an ink made using the unpelletized fluffy powder as pigment.

The particular high abrasion resistance furnace black (used to make pellets known as Aromex HAF, made by the J. M. Huber Corporation) used in the above example is representative of the alkaline carbon blacks that may be treated according to my invention. Other alkaline carbon blacks, such as other furnace blacks—may also be used; the characteristics of such blacks are generally given in United States Patent 2,682,448, column 5, lines 1–25.

The determination of alkalinity referred to herein is based on conventional pH measurement of the carbon black as described broadly in United States Patent 2,641,533 and, in more detail, in A.S.T.M. Bulletin 215 of July 1956, page 56.

*Example 5*

A fluffy channel black of the same apparent density, particle size, and approximate surface as that of the Aromex HAF fluffy furnace black used in Example 4, which channel black has a pH of 4.1 to 4.5, is treated and pelletized to an apparent bulk density of 17–18 pounds per cubic foot according to the procedure given for the furnace black of Example 4 given above. The pellets thus produced settle out of the vehicle and do not provide a smooth suspension when admixed, in the same quantities and manner with the same ink oil used in Example 4, and treatment of the admixture of oil and pellets in the colloid mill produces a tacky, gritty (more than 2% by weight as residue on a 325 mesh screen) suspension not usable as a news ink.

Another sample of that same fluffy channel carbon black is treated according to the procedure of United States Patent 2,643,182. This treatment does not affect the particle size or the bulk density but produces a distinct change in pH of the carbon black to a pH of about 9. This resultant fluffy alkaline channel black, when treated and pelletized as is the fluffy furnace black of Example 4, provides pellets which also readily disperse on only mild agitation with the ink vehicle used in Example 4 in the same relative quantities of oil and carbon there used. This resultant suspension is readily treated in a colloid mill, as in Example 4 to produce an entirely commercially acceptable news ink.

While, according to the disclosure given in the above examples an oil furnace black of an apparent density of three pounds per cubic foot was used as feed (and such apparent densities preferably usually run from three to five pounds per cubic foot), unagitated furnace carbon black from combustion—of gas or a gas-oil mixture—or other carbon black of an alkaline reaction and having an apparent density from two to twelve pounds per cubic foot may be used as feed to the process of my invention with equally satisfactory results.

While a reasonably viscous oil was used in the above examples as the diluent, such oils are only exemplary of the commercially available ink oils and lighter oils that may be used. Such oils, for instance that have flash points of 300 to 400° F., fire points of about 350 to 460° F., pour points of −10 to −40° F., aniline points of 64 to 85° C. and 20–23° A.P.I. gravity, and oils of 105 S.U. at 100° F. are most suitable.

While, according to the embodiment of the invention described in the above examples 5% by weight of gilsonite was used as the asphaltic material dispersant with 95% by weight of carbon black, the amount of gilsonite may vary from 3% by weight upward to 10% by weight: this upper limit is primarily an economical one and may be extended within economic limits. Also, a wide range of materials may be used in practicing my invention as will be apparent to those skilled in the art, which materials perform the above described function of rendering free-flowing a buttery mixture of fluffy carbon black in a news ink vehicle by dispersing said carbon particles in said news ink vehicle. Barbadoes manjak, also known as glance pitch, may also be equally satisfactorily substituted, weight for weight, for the gilsonite in the above examples and descriptions of satisfactory ranges thereof.

As further specific examples of asphaltic material disperants that may be used in my invention, the gilsonite used in the procedure of the above example may be replaced by the use of the same range of proportionate weights of an asphaltene-rich petroleum residue, such as are known as Coblax 100 and Coblax 1200 and was used in Example 1. These residues are obtained from asphaltic base petroleums by the deasphalting of asphaltic base petroleum as by propane or butane deasphalting procedures. Such procedures of deasphalting are conventional and are, for instance, described at pages 177–180 of volume 2 of "The Encyclopedia of Chemical Technology" (Interscience Publishers, Inc., New York, 1948). With such substitution for the gilsonite in the embodiments and examples of the process above described, equivalent results, i.e. equally strong and equally dispersible pellets of carbon black and equally satisfactory inks are obtained.

The above-mentioned asphaltic materials or dispersants—gilsonite, manjak, and petroleum residues obtained by deasphalting asphaltic base petroleum—not only all are petroleum derivatives similarly (about 10% to 60% by weight) rich in asphaltenes, but, additionally, are representative of dispersants which have the ability to form with the fluffy alkaline black of two to twelve pounds per cubic foot apparent density smooth-flowing dispersions in ink oils.

It is significant that this property of forming a smooth-flowing carbon black dispersion in news ink vehicles is exhibited when such asphaltic materials or dispersants are incorporated into the carbon black before that carbon black is pelletized but that, if that same carbon black is first pelletized in the absence of such materials, with subsequent incorporation into the pellets of these same materials, that thus-pelletized form of carbon black does not exhibit the desirable property of dispersibility in ink oils as is shown by the pellets of my invention. As the behaviour of these pellets of my invention is unique and not before encountered, and is not merely the sum of the characteristics of its components, it is obvious that a new composition of matter, productive of new and useful results, has been formed.

While the diluent oil and asphaltic material dispersant therein has been described as being dispersed in the carbon black while that carbon black was held at a certain temperature as, 100° C. and 325° F. in some of the above examples, the absolute value of the temperature at which the carbon black is held during the distribution therethrough of the gilsonite containing oil is not critical per se. However, the temperature of the carbon black and of gilsonite, manjak, "Coblax" or the like, or the suspension thereof in a vehicle or diluent such as an ink oil, should be sufficiently high to render said latter agent to be sufficiently fluid—and preferably free-flowing—to allow complete and substantially even distribution of that suspension or liquid through the mass of the carbon black. If the black were at such a low temperature as to cause the suspension of the dispersing agent which is admixed therewith to congeal and become buttery rather than if the black were at a sufficiently high temperature to provide fluidity of the agent initially admixed therewith, there is not quickly obtained the desired even distribution of the agent. Sufficient suspending medium or diluent soluble in a news ink vehicle, such as an ink oil, may be admixed with the agent, as gilsonite, manjak, etc., to form a solution or suspension thereof whereby to carry into each 97 parts by weight of the black at least 3 parts by weight of the gilsonite or its equivalent while providing the desired fluidity at a temperature sufficiently low to be economical and safe in operation. However, it is desirable to limit the amount of suspending oil or diluent medium used to thin the gilsonite or its equivalent for economic purposes and to reduce the weight of the pellets.

Other conventional means of distributing the gilsonite or its equivalent evenly through the mass of the black may be used—such as vaporization or atomization.

The duration of the mixing of the gilsonite or its equivalent asphaltic material with the carbon black should be sufficiently long to allow a homogeneous distribution thereof through the mixture, but, preferably, should not continue to produce any substantial increase or decrease in the apparent density of the mass beyond that of the initial feed.

The treatment in the screen mill is desirable to rapidly complete the homogenization begun in the pin mixer and also to remove coke and other extraneous material which, during commercial practice, may be found in the product of the pin mixer as well as to break up agglomerates formed in the mixer. This treatment, for which other equivalent commercially available apparatus may be used, should accordingly be of such duration and use such appropriate sized screen discharge as to accomplish this desired result. It is preferred that the treatment in the screen mill be continued until homogenization is substantially complete but not past the point at which the apparent density of the material discharged from the screen mill increases substantially over that of the feed thereto.

While the pelletizing in the above-described example is accomplished in a drum in a batch process, other conventional pelletizing apparatus and continuous processing may be used such as are described in United States Patents 2,674,522, 1,892,074 and 2,164,164 and such use is clearly within the scope of my invention.

Notwithstanding the fact that carbon black pellets of greater apparent density are stronger and easier to handle and more economical of freight car space than those of lesser apparent density, it is preferable to continue the pelletizing process for the manufacture of the pellets of this invention to produce apparent densities of the product not greater than twenty pounds per cubic foot.

The stirring and agitation of the pellets with the ink vehicle, as disclosed in the above examples, may be quite gentle; it is quite adequate if it be merely sufficient to keep the pellets suspended in the ink vehicle. Such agitation, for example, at 180° F. for 1 hour or at 150–170° F. for 2 hours with the very light agitation that may be provided by a conventional laboratory mixer e.g. a "Lightnin" Model V mixer having but 1/42 H.P. at 600 r.p.m. with a 2" blade—for a 2-liter volume of ink and pellets, is entirely satisfactory for the pellets of my invention although such mild agitation does not at all serve to disperse the same alkaline carbon black in the same news ink vehicle if that black be pelletized without first being treated according to my invention as above described. Greater speeds of dispersion for the pellets made according to my invention result at more elevated temperatures especially with the use of more vigorous mechanical action. While the above examples have been largely directed to making news inks and taught the dispersion of the pellets made according to my invention in news ink vehicles such as mineral oils, these pellets are also to be understood as adapted for making inks using other vehicles than those above specifically enumerated, although these pellets are particularly useful, because of the economics involved, for dispersion in news ink vehicles. The process of incorporating the pellets made according to my invention into these other vehicles is substantially the same as that above disclosed for the incorporation of the pellets into the mineral oil news ink vehicles—namely, mild agitation at a somewhat elevated temperature—whereupon a smooth suspension is formed, which suspension may then be finished, as by milling by means of a three-roller mill. There may be used as vehicles, for instance, heat-set ink vehicles and drying oil vehicles such as unbodied linseed oil of low viscosity, as well as the linseed varnishes of high viscosity, bodied linseed oils, and other drying oils, and such vehicle may contain resinous material incorporated therein. There will thereby be made inks containing more carbon black than news inks, such as letter press publication inks and offset inks.

It will be apparent that, by my invention, I have produced new and valuable pellets having novel and desirable properties. At the same time I have employed cheap and abundant materials. Further, by the use of my invention, the utility of carbon blacks of alkaline reaction has been widened. It is therefore to be understood that the form and procedure of my invention herewith specifically described are to be taken as preferred examples of the same and that various changes and modifications in materials and details of procedure may be resorted to without departing from the spirit of my invention or the scope of the subjoined claims.

I claim:

1. A process for forming news ink pellets of furnace carbon black which have an apparent density of 14 to 20 pounds per cubic foot and the solids of which are readily dispersible in conventional news ink vehicles comprising first preparing a mixture consisting essentially of between about 85 and 97 parts by weight of the carbon black and between about 3 and 10 parts by weight of asphaltene-rich asphaltic material dispersing agent by admixing a fluffy form of furnace carbon black particles and a fluid state of such dispersing agent the asphaltic material of which is selected from the group consisting of gilsonite, manjak and petroleum residues obtained by deasphalting asphaltic base petroleum in the recited proportions; and then pelletizing said mixture in a rotating pelletizing drum to an apparent density of 14 to 20 pounds per cubic foot of the pellets.

2. The pelletized news ink product produced by the process defined in claim 1.

3. The process as defined in claim 1 characterized by preparation of said fluid dispersing agent before addition to the carbon black particles by mixing the asphaltene-rich asphaltic material with an amount by weight of diluent miscible with conventional news ink vehicles no greater than the amount by weight of the asphaltic material to facilitate subsequent distribution of the latter through the mass of carbon black particles.

4. The process as defined in claim 1 characterized by preparation of said dispersing agent before addition to the carbon black particles by raising the temperature of the asphaltene-rich asphaltic material to a degree producing a fluidity assuring even distribution of the asphaltic material through the mass of carbon black particles upon subsequent addition thereto without the aid of a diluent.

5. The pelletized news ink product produced by the process defined in claim 4.

6. A process for forming pellets of furnace carbon black which have an apparent density of 14 to 20 pounds per cubic foot and the solids of which are readily dispersible in conventional news ink vehicles comprising mixing with a diluent, which is miscible with conventional news ink vehicles, asphaltene-rich asphaltic material selected from the group consisting of gilsonite, manjak and petroleum residues obtained by deasphalting asphaltic base petroleum to form a fluid dispersing agent, the amount by weight of the diluent being no greater than that of the asphaltic material; then thoroughly admixing an amount of the fluid dispersing agent with an amount of fluffy form of furnace carbon black particles at a temperature about 212° to 325° F. to form a mixture consisting essentially of between about 85 and 97 parts by weight of the carbon black particles and between about 3 and 10 parts by weight of the asphaltene-rich asphaltic material; and thereafter pelletizing the mixture in a rotating pelletizing drum to an apparent density of 14 to 20 pounds per cubic foot of the pellets.

7. The pelletized news ink product produced by the process defined in claim 6.

8. A process for forming news ink pellets of alkaline carbon black the solids of which are readily dispersible in conventional news ink vehicles comprising first preparing a mixture consisting essentially of between about 85 and 97 parts by weight of a fluffy form of alkaline carbon black and between about 3 and 10 parts by weight of asphaltene-rich asphaltic material dispersing agent by admixing with the fluffy alkaline carbon black particles such dispersing agent in fluid state, the asphaltic material of said dispersing agent being selected from the group consisting of gilsonite, manjak and petroleum residues obtained by deasphalting asphaltic base petroleum in the recited proportions; and then pelletizing said mixture in a rotating pelletizing drum to an apparent density of 14 to 20 pounds per cubic foot of the pellets.

References Cited in the file of this patent

UNITED STATES PATENTS

| | | |
|---|---|---|
| 2,164,164 | Price | June 27, 1939 |
| 2,351,585 | Breyer | June 20, 1944 |
| 2,453,557 | Voet | Nov. 9, 1948 |
| 2,518,211 | Wiegand | Aug. 8, 1950 |
| 2,635,057 | Jordan | Apr. 14, 1953 |
| 2,699,381 | King | Jan. 11, 1955 |
| 2,834,044 | Antonsen et al. | May 13, 1958 |
| 2,847,710 | Pitzer | Aug. 19, 1958 |